(12) United States Patent
Seruntine et al.

(10) Patent No.: US 12,215,667 B2
(45) Date of Patent: Feb. 4, 2025

(54) LONGITUDINAL EDGE EXTENSION

(71) Applicant: BLADE DYNAMICS LIMITED, Eastleigh (GB)

(72) Inventors: Nicholas Seruntine, New Orleans, LA (US); Paul Hayden, Eastleigh (GB); Guy Scoggin, New Orleans, LA (US); Mark Hancock, Eastleigh (GB); Hans Minnee, NH (NL)

(73) Assignee: BLADE DYNAMICS LIMITED, Eastleigh (GB)

( * ) Notice: Subject to any disclaimer, the term of this patent is extended or adjusted under 35 U.S.C. 154(b) by 269 days.

(21) Appl. No.: 17/610,099

(22) PCT Filed: May 8, 2020

(86) PCT No.: PCT/US2020/032140
§ 371 (c)(1),
(2) Date: Nov. 9, 2021

(87) PCT Pub. No.: WO2020/231828
PCT Pub. Date: Nov. 19, 2020

(65) Prior Publication Data
US 2022/0235736 A1 Jul. 28, 2022

Related U.S. Application Data

(60) Provisional application No. 62/846,229, filed on May 10, 2019.

(51) Int. Cl.
*F03D 1/06* (2006.01)
*B29D 99/00* (2010.01)
*B29L 31/08* (2006.01)

(52) U.S. Cl.
CPC ....... *F03D 1/0675* (2013.01); *B29D 99/0028* (2013.01); *B29L 2031/085* (2013.01);
(Continued)

(58) Field of Classification Search
CPC .... F03D 1/0675; F03D 1/0683; F03D 1/0641; B29L 203/085
See application file for complete search history.

(56) References Cited

U.S. PATENT DOCUMENTS 3,356,153 A * 12/1967 Schramm .............. B64C 27/473
416/226
2007/0036659 A1 * 2/2007 Hibbard ................ B29C 66/303
416/233

(Continued)

FOREIGN PATENT DOCUMENTS

DE 102011051329 B4 * 1/2019 ........... F03D 1/0675
EP 2623773 A2 8/2013
(Continued)

*Primary Examiner* — Courtney D Heinle
*Assistant Examiner* — Ryan C Clark
(74) *Attorney, Agent, or Firm* — Nath, Goldberg & Meyer; Jerald L. Meyer; Tanya E. Harkins

(57) ABSTRACT

A system and method for manufacturing a wind turbine blade. The wind turbine blade includes a shell structure defining a leading edge and a trailing edge. The wind turbine blade also includes a longitudinal edge extension arranged to extend at least partially along the leading edge or at least partially along the trailing edge to modify an aerodynamic characteristic of the wind turbine blade. The longitudinal edge extension includes a center section and a peripheral section comprising attachment means, and the shell structure is arranged to engage with the attachment means to secure the longitudinal edge extension.

32 Claims, 11 Drawing Sheets

(52) U.S. Cl.
CPC ..... *F05B 2230/23* (2013.01); *F05B 2240/303* (2020.08); *F05B 2240/304* (2020.08); *F05B 2280/6003* (2013.01)

(56) References Cited

U.S. PATENT DOCUMENTS

| | | | | |
|---|---|---|---|---|
| 2007/0140859 | A1* | 6/2007 | Schreiber | F04D 29/324 |
| | | | | 416/223 R |
| 2009/0290982 | A1 | 11/2009 | Madsen et al. | |
| 2010/0028161 | A1 | 2/2010 | Vronsky et al. | |
| 2010/0104461 | A1* | 4/2010 | Smith | F04D 29/34 |
| | | | | 416/223 R |
| 2011/0059290 | A1* | 3/2011 | Gage | C09J 5/00 |
| | | | | 156/91 |
| 2011/0103962 | A1* | 5/2011 | Hayden | F03D 1/0675 |
| | | | | 416/226 |
| 2011/0135477 | A1* | 6/2011 | Mohammed | F03D 7/0236 |
| | | | | 29/889.71 |
| 2011/0142668 | A1 | 6/2011 | Rao | |
| 2011/0142681 | A1 | 6/2011 | Fisher et al. | |
| 2012/0034094 | A1* | 2/2012 | Wansink | B29D 99/0025 |
| | | | | 156/196 |
| 2012/0134817 | A1* | 5/2012 | Bagepalli | F03D 1/0675 |
| | | | | 416/62 |
| 2013/0164144 | A1* | 6/2013 | Bendel | F03D 80/50 |
| | | | | 29/889.7 |
| 2013/0272892 | A1 | 10/2013 | Liu | |
| 2014/0193271 | A1* | 7/2014 | Dudon | C23C 4/02 |
| | | | | 427/448 |
| 2014/0271213 | A1 | 9/2014 | Yarbrough et al. | |
| 2015/0026980 | A1* | 1/2015 | Tellier | F04D 29/324 |
| | | | | 29/889.1 |
| 2015/0037112 | A1* | 2/2015 | Nagabhushana | B60P 3/40 |
| | | | | 410/44 |
| 2015/0132137 | A1* | 5/2015 | Humblot | B29D 99/0025 |
| | | | | 156/92 |
| 2015/0198141 | A1* | 7/2015 | Hayden | F03D 1/0675 |
| | | | | 416/212 R |
| 2015/0204306 | A1* | 7/2015 | Herr | F03D 7/0232 |
| | | | | 416/23 |
| 2016/0177969 | A1* | 6/2016 | Schreiber | F04D 29/388 |
| | | | | 416/224 |
| 2016/0215757 | A1* | 7/2016 | Behmer | B29C 70/086 |
| 2016/0348643 | A1 | 12/2016 | Fujioka et al. | |
| 2017/0122287 | A1* | 5/2017 | Dobbe | F03D 1/0675 |
| 2017/0226865 | A1* | 8/2017 | Kray | F01D 9/041 |
| 2018/0209400 | A1* | 7/2018 | Drachmann Haag | B32B 27/365 |
| 2019/0062591 | A1 | 2/2019 | Meuler et al. | |
| 2019/0145375 | A1* | 5/2019 | Miller | F03D 1/0675 |
| | | | | 416/223 R |
| 2021/0207576 | A1* | 7/2021 | Larsen | F03D 80/50 |
| 2021/0262350 | A1* | 8/2021 | Mathew | F03D 80/30 |
| 2022/0065217 | A1* | 3/2022 | Tobin | B29D 99/0028 |
| 2022/0258430 | A1* | 8/2022 | Kimiaeifar | B29C 66/71 |

FOREIGN PATENT DOCUMENTS

| | | |
|---|---|---|
| EP | 2318702 B1 | 9/2014 |
| EP | 2153059 B2 | 2/2019 |
| KR | 102338703 B1 * | 12/2021 |
| WO | WO-2019179583 A1 * | 9/2019 ........... F03D 1/0675 |
| WO | 2019/207428 A2 | 10/2019 |
| WO | 2019/228599 A1 | 12/2019 |

* cited by examiner

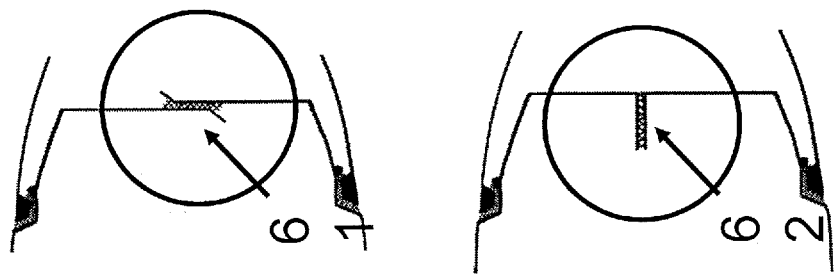
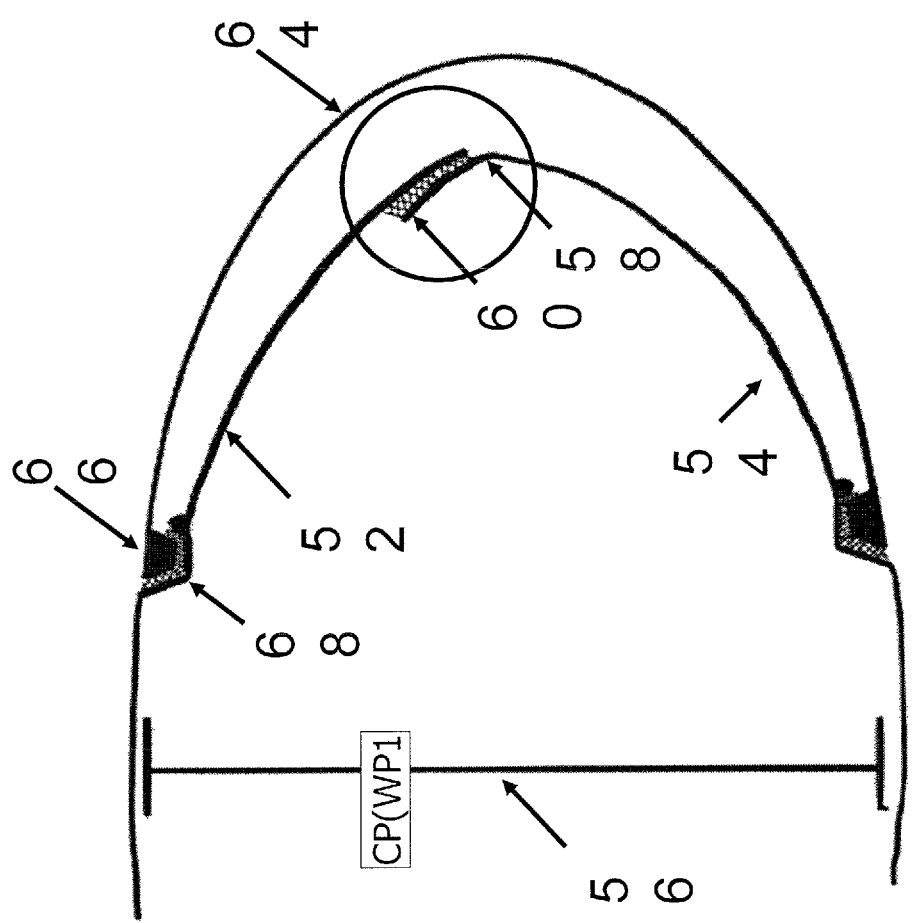
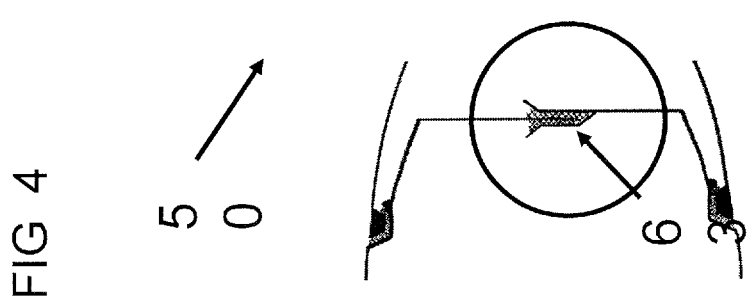
FIG 4

LONGITUDINAL EDGE EXTENSION

This is a National Phase Application filed under 35 U.S.C. 371 as a national stage of PCT/US2020/032140, filed May 8, 2020, an application claiming the benefit of U.S. Provisional Application No. 62/846,229 filed May 10, 2019, the content of each of which is hereby incorporated by reference in its entirety.

This invention generally relates to wind turbines and more specifically to wind turbine rotors or blades typically approaching lengths of 50 meters and more. However, it is readily applicable to other types of wind-exposed surfaces negotiating aerodynamic forces, resistance and aerodynamics, such as helicopter rotor blades, or fan blades.

BACKGROUND

Modern wind turbines usually include a rotor with a considerable diameter size, as illustrated in FIG. 1. Referring to FIG. 1, a wind turbine 1 is typically mounted on a tower 2 and includes a wind turbine nacelle 3 positioned on top of the tower. The wind turbine rotor, including three wind turbine blades 5, is connected to the nacelle 3 through the low speed shaft, which extends out of the nacelle front. As illustrated in FIG. 1, wind beyond a certain level will activate the rotor due to the lift induced on the blades and allow it to rotate in a perpendicular direction to the wind. The rotation movement is converted to electric power, which is usually supplied to the transmission grid as known by skilled persons within the area.

Wind turbine blades for modern wind turbines are typically approaching lengths of 50 meters and more. Large three-bladed wind turbine blades typically rotate with tip speeds in the range of 75 to 100 meters per second. For some two-bladed turbines, the blades can rotate with a tip speed as high as 130 meters per second. This causes very severe aerodynamic conditions at the tip of the blade as well as along the outer ⅓ of the leading edge, leading to blade loss in these areas. Although wind blades are typically expected to last for 20 years, this is often not the case due to the loss caused by aerodynamic conditions to the leading edge necessitating blade repair. However, repair of the leading edge is not easy since it is typically carried out with the blade still erected on the turbine. This also has significant cost and safety implications, particularly if the wind turbine is located offshore.

In order to create wind turbine blades that are capable of withstanding the significant forces of the wind as well as their own weight, the blades are constructed with two glass or other fiber composite shells and one or more internal glass or other fiber composite shear webs all adhered to each other.

Typically, wind turbine blades have to undergo an aftertreatment, as the surface of the wind turbine shells, specifically the leading edge and the trailing edge need smoothing so that the wind will not be slowed down or make any noise when it moves across the surface of the blades. All shell joints, scratches and cavities have to be treated with gelcoat or similar filling materials. Finally, the blades are grounded and polished until they are smooth.

However, the abovementioned aftertreatment methods of manufacturing wind turbine blades all have disadvantages. Especially, they consume a disproportionate amount of manpower, demanding significant amount of space and specialized systems. Further, they are demanding in time and expertise, during construction as well as in latter quality control procedures.

Furthermore, Annual Energy Production (AEP) of typical modern wind turbines currently suffers due to poor leading edge geometry and post processing of a blade leading edge is costly and difficult. Additionally, offshore blades would benefit from a leading-edge longitudinal edge extension that could be removed in the field when damaged due to lightning or bird strike or worn due to erosion.

A commonly known performance enhancement initiative for the leading edges is to use outer surface metallic leading edge covers integrated with the composite structure. However, these lead to an increase in the mass of the blade tip and, thus, increase the loads on the rest of the blade and the turbine and leading to premature separation. Metallic leading edges also increase the local stiffness of the blade, which can worsen aerodynamic performance, and can complicate the lightning protection systems required for the blade due to their conductive nature. As well, they inherently distort the designed aero-surface, leading to an inherent reduction in AEP.

There remains scope for improving energy efficiency wind turbine blades and manufacture wind turbine blades without aftertreatment involving time consuming processes eventually leading to an increase in the costs of the blades.

BRIEF DESCRIPTION

According to a first aspect of the present invention, the present disclosure relates to a wind turbine blade comprising a shell structure defining a leading edge and a trailing edge. The wind turbine blade also comprises a longitudinal edge extension arranged to extend at least partially along the leading edge or at least partially along the trailing edge to modify an aerodynamic characteristic of the wind turbine blade. The longitudinal edge extension preferably comprises a center section and at least one peripheral section comprising attachment means. In a preferred embodiment, the shell structure is arranged to engage with the attachment means to secure the longitudinal edge extension.

In a preferred embodiment, the longitudinal edge extension is adaptably and discretely coupled to at least one of: the leading edge or the trailing edge. The longitudinal edge extension preferably comprises a structurally independent external longitudinal edge extension. Advantageously, the longitudinal edge extension is configured to provide rigidity to at least one of the leading edge and the trailing edge against aerodynamic forces prevailing under normal operating conditions.

The shell structure preferably comprises at least one shear web structure enclosed within, internally coupled to the shell structure and configured to provide structural integrity to the shell structure. In a preferred embodiment, the shell structure comprises at least one upwind shell and at least one downwind shell joined along at least one of: the leading edge or the trailing edge.

In a preferred embodiment, at least one of the leading edge and the trailing edge comprises at least one of: an auto-engaging and auto-indexing longitudinal joint, in at least one of: a single lap-shear connection, a double-lap shear connection, and a butted shear connection, with at least one of: a mechanical fastener, a thixotropic adhesive paste, an injected or infused low-viscosity resin system, and resin-impregnated woven textiles. Preferably, at least one of the leading edge and the trailing edge adaptably and comprehensively transitions or sweeps respectively to the trailing edge or to the leading edge of the blade.

In a preferred embodiment, the longitudinal edge extension is removably coupled to the shell structure.

In another preferred embodiment, the longitudinal edge extension is semi-permanently attached to the wind turbine shell structure with bonding elements.

In yet another preferred embodiment, the longitudinal edge extension is fixed to an outer surface of the at least one of: the leading edge or the trailing edge such that a plurality of edges of the longitudinal edge extension are flush with corresponding surfaces of the blade.

In a further preferred embodiment, the longitudinal edge extension comprises a sandwich configuration comprising core materials comprising balsa, foam and honeycomb and wherein the longitudinal edge extension further comprises a thickness ranging between 1 mm and 60 mm. Alternatively or in addition, the longitudinal edge extension comprises a non-sandwich configuration comprising a thickness ranging between 0.1 and 20 mm thickness.

In yet another preferred embodiment, a length of the longitudinal edge extension ranges between 1 and 150 meters.

In one preferred embodiment, the longitudinal edge extension covers a first percentage of chord area on the upwind shell and a second percentage of chord area on the downwind shell, wherein both of the first percentage of chord area and the second percentage of chord area range between 5% and 40%, considering from the respective stagnation points.

In another preferred embodiment, the longitudinal edge extension comprises either thermoplastic or thermoset resin, optionally in combination with at least one of glass, carbon, aramid or other fibers. In yet another preferred embodiment, the longitudinal edge extension comprises at least one of: metals, ceramics, or metals and ceramics, optionally in combination with at least one of glass, carbon, aramid or other fibers. In yet another preferred embodiment, the longitudinal edge extension comprises materials independently designed to result in an enhanced performance of the longitudinal edge extension alone, independent of rest the blade.

In one preferred embodiment, the longitudinal edge extension comprises a center section and at least one peripheral section, wherein the longitudinal edge extension is partly or totally pre-formed to a shape substantially corresponding to the wind turbine blade or sections thereof. In another preferred embodiment, the longitudinal edge extension is molded or formed to a shape such that when sprung into final position, it has an aerodynamic shape.

In another preferred embodiment, the longitudinal edge extension comprises a center section and at least one peripheral section, wherein the at least one peripheral section of the longitudinal edge extension comprises lips for bonding or fastening with locations obtained by external tooling.

In yet another preferred embodiment, the at least one of: the leading edge or the trailing edge is covered by a corresponding clamp made of at least one of: thermoplastic, graphite, metal, or other material, and thereby aerodynamically enhancing a joining area between the longitudinal edge extension and at least one of: the leading edge or the trailing edge. Preferably, the clamp is configured to serve as a grounding conduit to protect the blade from lightning strikes. In another preferred embodiment, the clamp is configured to de-ice the blade.

According to a second aspect of the present invention, there is provided a method of manufacturing a wind turbine blade, said method comprising: providing a shell structure defining a leading edge and a trailing edge; extending a longitudinal edge extension at least partially along the leading edge or at least partially along the trailing edge, wherein said longitudinal edge extension comprises a center section and at least one peripheral section comprising attachment means; arranging said shell structure to engage with the attachment means to secure the longitudinal edge extension; and modifying an aerodynamic characteristic of the wind turbine blade. In one embodiment, the extending a longitudinal edge extension comprises extending a structurally independent external longitudinal edge extension.

In a preferred embodiment, the method of manufacturing further comprises adaptably and discretely coupling the longitudinal edge extension to at least one of: the leading edge or the trailing edge.

In another embodiment, the method of manufacturing further comprises providing structural integrity to the shell structure by internally coupling and enclosing at least one shear web structure within the shell structure.

In another embodiment, providing the shell structure comprises joining at least one upwind shell and at least one downwind shell along at least one of: the leading edge or the trailing edge.

In yet another embodiment, the method of manufacturing further comprises joining the at least one upwind shell and at least one downwind shell along at least one of: an auto-engaging and auto-indexing longitudinal joint, in at least one of: a single lap-shear connection, a double-lap shear connection, and a butted shear connection, with at least one of: a mechanical fastener, a thixotropic adhesive paste, an injected or infused low-viscosity resin system, and resin-impregnated woven textiles.

In a further embodiment, the method of manufacturing further comprises adaptably and comprehensively transitioning or sweeping at least one of the leading edge and the trailing edge respectively to the trailing edge or to the leading edge.

In yet another embodiment, the method of manufacturing further comprises configuring the longitudinal edge extension to provide rigidity to at least one of the leading edge and the trailing edge against aerodynamic forces prevailing under normal operating conditions.

In one embodiment, the method of manufacturing further comprises removably coupling the at least one longitudinal edge extension to the shell structure. In another embodiment, the method of manufacturing further comprises semi-permanently attaching the longitudinal edge extension to the wind turbine shell structure with bonding elements. In yet another embodiment, the method of manufacturing further comprises attaching the longitudinal edge extension to an outer surface of the at least one of: the leading edge or the trailing edge such that a plurality of edges of the longitudinal edge extension are flush with corresponding surfaces of the blade.

In one preferred embodiment, the longitudinal edge extension comprises a sandwich configuration comprising core materials comprising balsa, foam and honeycomb and the longitudinal edge extension further comprises a thickness ranging between 1 mm and 60 mm. Alternatively or in addition, the at least one longitudinal edge extension comprises a non-sandwich configuration comprising a thickness ranging between 0.1 and 20 mm thickness.

In one preferred embodiment, a length of the at least one longitudinal edge extension ranges between 1 and 150 meters.

In another preferred embodiment, the longitudinal edge extension covers a first percentage of chord area on the upwind shell and a second percentage of chord area on the downwind shell, wherein both of the first percentage of chord area and the second percentage of chord area range between 5% and 40%, considering from the respective stagnation points.

In yet another preferred embodiment, the longitudinal edge extension comprises either thermoplastic or thermoset resin, optionally in combination with at least one of glass, carbon, aramid or other fibers. In a further preferred embodiment, the longitudinal edge extension comprises at least one of: metals, ceramics, or metals and ceramics, optionally in combination with at least one of glass, carbon, aramid or other fibers. In yet another embodiment, the longitudinal edge extension comprises materials independently designed to result in an enhanced performance of the longitudinal edge extension alone, independent of rest of the blade.

In one preferred embodiment, the longitudinal edge extension is partly or totally pre-formed to a shape substantially corresponding to the wind turbine blade or sections thereof. Alternatively or in addition, the at least one peripheral section of the longitudinal edge extension comprises lips for self-engaging or self-locking with corresponding grooves formed on the leading edge. Preferably, the extension comprises the steps of: placing the lips within the corresponding grooves, the lips self-engaging or self-locking or self-indexing themselves within the corresponding grooves forming lip-to-groove spaces, and closing the lip-to-groove spaces with bonding or sealing elements. In another preferred embodiment, the longitudinal edge extension is molded or formed to a shape such that when sprung into final position, it has an aerodynamic shape.

In another preferred embodiment, the at least one peripheral section of the longitudinal edge extension comprises lips for bonding or fastening with locations obtained by external tooling.

In another embodiment, the method of manufacturing further comprises covering at least one of: the leading edge or the trailing edge by a corresponding clamp made of at least one of: thermoplastic, graphite, metal, or other material, and thereby advantageously aerodynamically enhancing a joining area between the longitudinal edge extension and at least one of: the leading edge or the trailing edge. In one preferred embodiment the clamp is configured to serve as a grounding conduit to protect the blade from lightning strikes. Alternatively or in addition, the clamp is configured to de-ice the blade.

According to a third aspect of the present invention, there is provided a longitudinal edge extension for a wind turbine blade. In a preferred embodiment, the longitudinal edge extension is arranged to extend at least partially along an edge of an aerofoil structure to modify an aerodynamic characteristic of the aerofoil structure, wherein the longitudinal edge extension is adaptably and discretely couplable to the edge.

Preferably the longitudinal edge extension may be manufactured according to any of the methods disclosed above.

Preferably the longitudinal edge extension may comprise one or more of the structural features described above.

Various other features will be apparent from the following detailed description and the drawings.

BRIEF DESCRIPTION OF THE DRAWINGS

An example of the present invention will now be described with reference to the following drawings in which:

FIG. 4 illustrates an isolated view of the leading edge region of the wind turbine blade of FIGS. 1-3

DETAILED DESCRIPTION

This invention includes embodiments that relate to wind turbines and more specifically to wind turbine rotors or blades. However, it is readily applicable to other types of wind-exposed surfaces negotiating aerodynamic forces, resistance and aerodynamics, such as helicopter rotor blades, or fan blades.

It shall be emphasized that with the term "longitudinal edge extension" is meant a cover that is situated as a surface to any aerofoil structure such as a wind turbine or a helicopter blade or sections hereof, an aeroplane or any other aircraft wing or sections hereof and thus establishing a new front for the original leading edge (LE) or a new end for the original trailing edge (TE) at the covering position.

It is possible to control sections of the wind turbine blade surface with one or more easily controllable and constructible longitudinal edge extensions. Especially, it is possible to establish a wind turbine blade with a smooth surface at the parts that are particularly important in creating advantageous flow over the surfaces such as the front or leading section of the wind turbine blade. In the construction of the wind turbine blade it is thus not necessary to involve aftertreatment including time-consuming processes eventually leading to an increase in the costs of the blades such as grounding and polishing.

Figure 1:
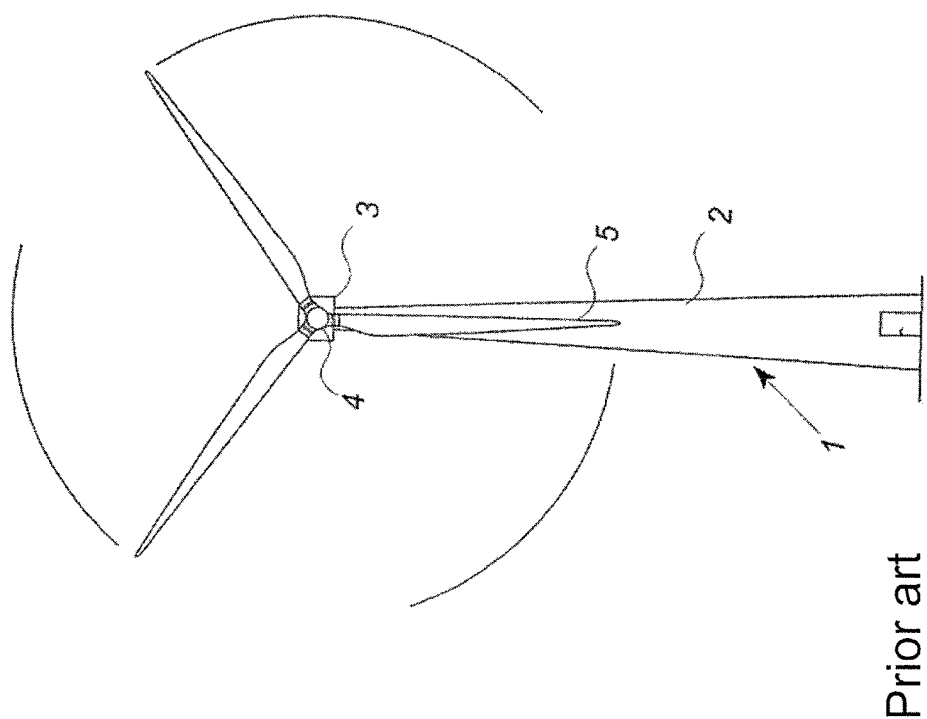
FIG. 1. illustrates a large modern wind turbine.
Figure 2:
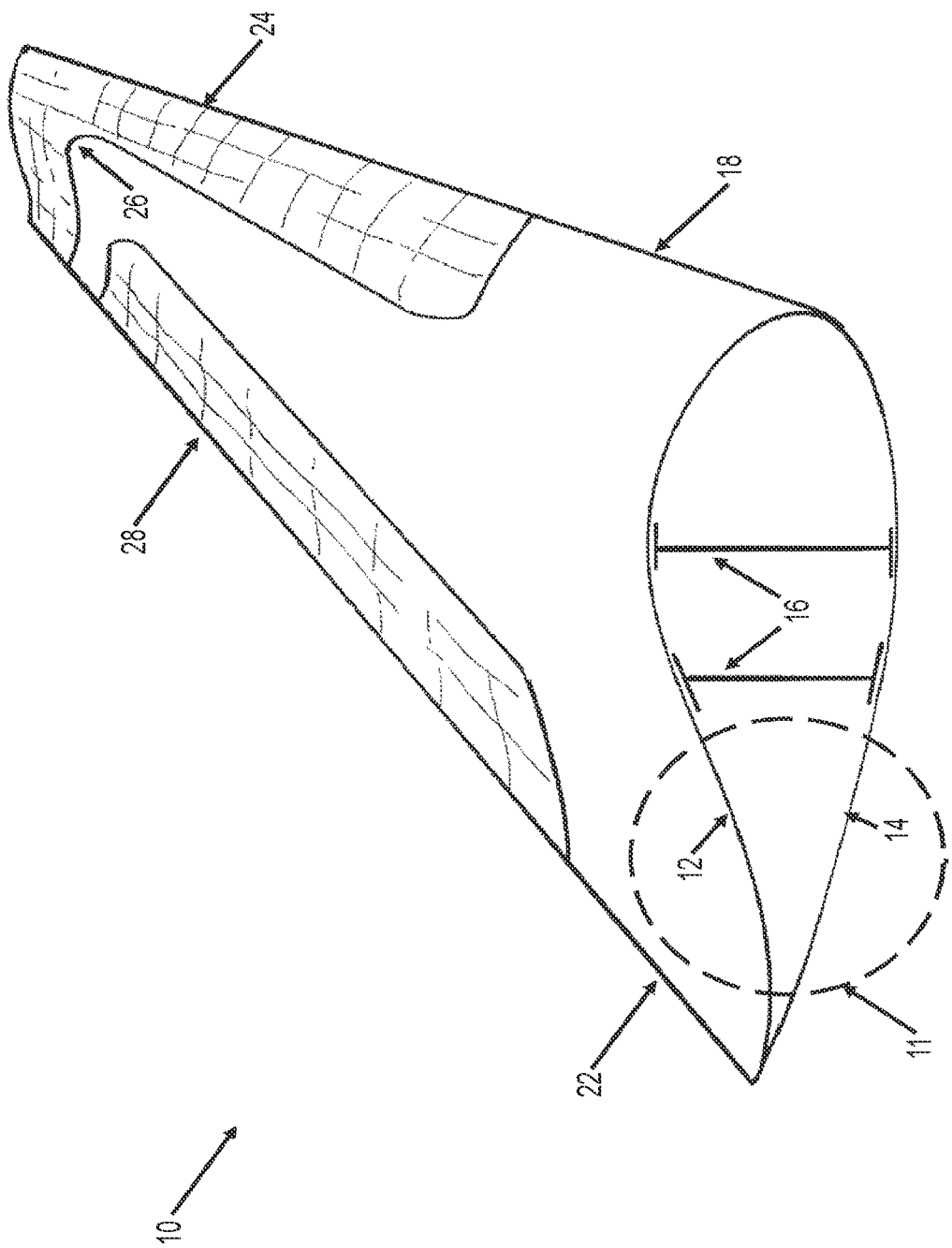
FIG. 2 illustrates isometric view of the wind turbine blade of FIG. 1.

FIG. 2 illustrates an isometric view 10 of wind turbine blade 5 of FIG. 1. Blade 5 includes a shell structure 11 that further includes a downwind shell 12 and upwind shell 14 joined along a first longitudinal edge (leading edge) 18 and a second longitudinal edge (trailing edge) 22 to constitute a complete and closed composite shell structure. A typical shear web structure 16 formed with flanges is enclosed within and internally coupled to the shell structure. The shear web structure 16 provides structural integrity to the shell structure.

Referring to FIG. 2, part 24 is a structurally independent and external longitudinal edge extension extending at least partially along the leading edge or trailing edge to modify an aerodynamic characteristic of the wind turbine blade. The longitudinal edge extension typically includes a center section and at least one peripheral section including attachment means. Further, the shell structure is arranged to engage with the attachment means to secure the longitudinal edge extension. Furthermore, longitudinal edge extension 24 is adaptably and removably coupled to the shell structure 11 and it enhances an aerodynamic property of the blade 5.

Region 26 is an exemplary transition region on the longitudinal edge extension 24 that embodies a change in cross sectional area of the extension and thereby provide additional aerodynamic enhancement at the tip region of the blade 5. In another embodiment of the invention, the trailing edge 22 may be harnessed with an analogous independent external trailing edge extension 28 that is designed to further enhance an aerodynamic property of the blade 5.

The longitudinal edge extensions 24 and 28, if made of thermoplastic material, can be extruded or cast directly. Alternatively, the step of fixing thermoplastic longitudinal edge extension to the longitudinal edge may include heating thermoplastic longitudinal edge extension and the longitudinal edge at a temperature of at least 160° C., preferably 160° C. to 200° C., and pressing them together. This ensures that thermoplastic longitudinal edge extension is strongly fixed to the longitudinal edge. More particularly, the longitudinal edge extension and longitudinal edge are fixed together at a temperature of between 60° C. and 150° C. This ensures that thermoplastic longitudinal edge extension is strongly fixed to the longitudinal edge and also avoids the loss of shape of thermoplastic longitudinal edge extension which may occur at higher temperatures, thus providing a high quality surface finish. In some instances, prior to and during thermal welding, the thermoplastic longitudinal edge extension may be globally and locally aligned via edge features that index complementary features on the main structure in order to substantially reduce and even eliminate the need for additional assembly fixturing. In some exemplary embodiments, a joggle will generally be needed to keep the outside surface of the leading edge extension flushed for aerodynamics with overlapping material varying the inside profile only.

In another embodiment of the invention, the longitudinal edge extension extensions 24 and 28 can also be made of conventional thermoset composite materials, such as polyester, vinyl ester, and epoxy resin systems, reinforced with carbon, armid, or glass fibers and thermoplastic bonding can be used with thermoset longitudinal edge extensions. The longitudinal edge extensions may also incorporate shaped plastics, to help form a comprehensive variety of bonding edge shapes. In yet another embodiment of the invention, the upwind shell and the downwind shell are joined along the longitudinal joints such that the longitudinal joint is auto-engaging and/or auto-indexing. Further, the longitudinal joints may be configured as any of: a single lap-shear connection, a double-lap shear connection, and a butted shear connection, with at least one of: a mechanical fastener, a thixotropic adhesive paste, an injected or infused low-viscosity resin system, and resin-impregnated woven textiles. Mechanical fasteners may include rivets, bolts and other such parts or components commonly used.

In yet another embodiment, the longitudinal edge extension 24 is set in and fixed to the outer surface of the longitudinal edge such that the edges of the longitudinal edge extension are flush with corresponding surfaces of the blade. With this arrangement, the longitudinal edge extension has no free edges, reducing the risk of thermoplastic (or other outer surface material) longitudinal edge extension peeling off from its edges and avoiding aerodynamic steps across the outer surface of the longitudinal edge extension which may otherwise worsen aerodynamic performance.

Typically, the longitudinal edge extension 24 is shaped around the external longitudinal edge 18 so that the edges of the longitudinal edge extension stay flushed with corresponding surfaces of the blade. This gives the resulting longitudinal edge extension a smooth outer profile. This smooth profile reduces the impact of the longitudinal edge extension on aerodynamic performance and avoids presenting free edges which could otherwise lead to the longitudinal edge extension being more easily removed from the longitudinal edge.

In another embodiment of the invention, the longitudinal edge extension may be fixed over the entire profile of a rotor blade, or over a particular part of the rotor blade, such as the trailing edge. More particularly, the longitudinal edge extension is fixed to one of the longitudinal edges of the rotor blade. In one particular embodiment of the invention, the longitudinal edge extension is fixed to the leading edge of the rotor blade.

In operation, separately molded longitudinal edge extension includes an integrated full tip that is attached to the main shell structure of the blade via self-engaging "clip-on" features, which in turn are bonded semi-permanently with adhesive. This invention allows a blade to be built similar in fashion but during post-molding operations, operators need not grind/sand/fair the blade's leading edge. Instead, they clip on a separately molded leading edge extension and simply remove away excess adhesive. The separately molded aero component, one-piece tip (no deviation of trailing edge thickness), "clip-on" feature self-engages with the shell structure of the blade and, thereby eliminate any need for complex jigging/fixturing in an offline assembly.

In other embodiments of the invention, different other methods of bonding component, any bonding material that is flexible enough to be extruded and applied, thermoplastic welding, thermoplastic component, metal component can be used. The edge extensions can be bonded as well with a variety of thermoset adhesive systems. Such bonding can be performed with MMA, polyurethane, epoxy, and vinyl ester formulations, that can in turn be used in conjunction with more flexible adhesive sealants for increased environmental toughness, structural integrity and post-processing labor reduction.

In another embodiment of the invention, the longitudinal edge extensions may cover between 2% and 45% and preferably 5% and 40% of chord area on the upwind shell and between 2% and 45% and preferably 5% and 40% percentage of chord area on the downwind shell, considering from the respective stagnation points.

In yet another embodiment of the invention, the one or more longitudinal edge extensions are positioned above one of the at least two longitudinal joints or a section hereof. As the joint of the wind turbine blade is covered with the longitudinal edge extension the construction of the wind turbine blade does not involve any further aftertreatment in relation to the joint.

Figure 3:
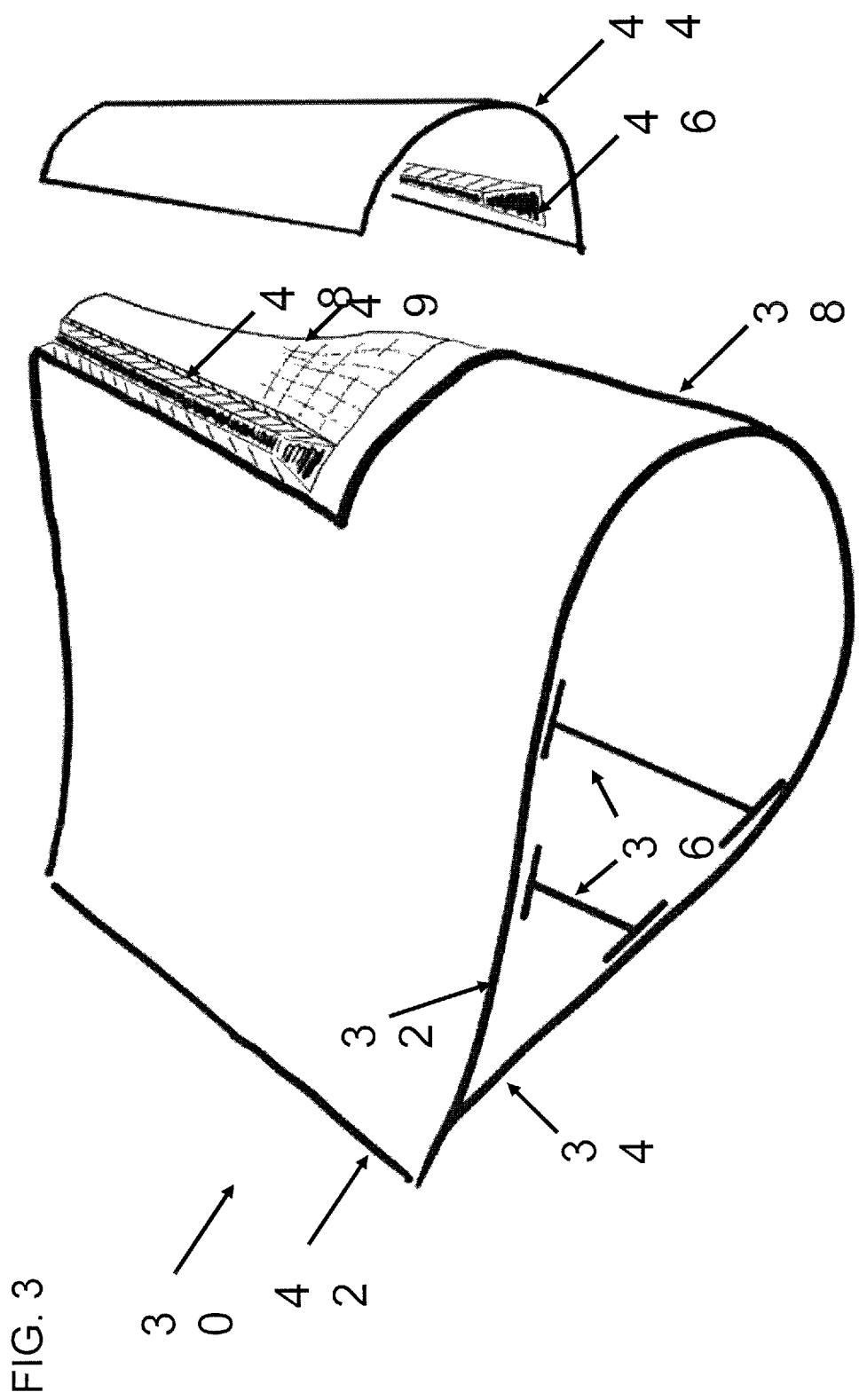
FIG. 3 illustrates an alternative, expanded, isometric view of the wind turbine blade of FIG. 1.

FIG. 3 illustrates an isometric view 30 of wind turbine blade 5 of FIGS. 1 and 2 with the longitudinal edge extension opened out from the body of the blade shell structure 11. Referring to FIGS. 2 and 3, blade 5 includes downwind shell 32 and upwind shell 34 joined along leading edge 38 and trailing edge 42 to constitute the complete and closed shell structure 11. Shear web structure 36 typically includes flanges and is enclosed within and internally coupled to the shell structure. The independent external leading edge extends partially along the leading edge 38. Longitudinal edge extension 44 include lips (also typically know as joggles) 46 that adaptably and removably couple the leading edge extension 44 into corresponding grooves 48 formed into the shell structure 11 of the blade 5. Region 49 is a transition region on the longitudinal edge extension 44 that embodies a change in cross sectional area of the extension and thereby provide additional aerodynamic enhancement at the tip region of the blade 5.

Referring to FIGS. 2 and 3, the longitudinal edge extension is semi-permanently or permanently attached to the wind turbine shell structure 11 with bonding elements. In one embodiment of the invention the attaching includes the steps of: placing the lips within the corresponding grooves on the shell structure 11, the lips self-engaging or self-locking themselves within the corresponding grooves forming lip-to-groove spaces and closing the lip-to-groove spaces with bonding elements.

In one embodiment of the invention the adhesive means is a one or two-component adhesive such as epoxy, polyurethane or methacrylate adhesives, it is possible to create a bonding particularly durable in relation to the different kind of weather conditions a wind turbine blade is exposed to.

The different longitudinal edge extensions are adapted to the section of the wind turbine blade that they cover. Especially, the widths of the longitudinal edge extensions vary in order to meet the different dimensions of the wind turbine blade at different positions e.g. the width at the root compared to the width at the tip. The height of the longitudinal edge extensions, and thus the side-to-side length of the longitudinal edge extensions, also varies in order to meet the above-mentioned different dimensions of the wind turbine blade.

In one embodiment of the invention, the wind turbine blade may be covered by one single longitudinal edge extension adapted to the wind turbine blade in its full length or at least a large part of it. In another embodiment of the invention, the wind turbine blade may be covered by rear covers adapted to the trailing edge of the wind turbine blade or even covers adapted to cover parts of the blade not including the leading or trailing edges. However, the desired behavior of the wind makes it especially advantageous to use the invention in connection with the front part of the wind turbine blade.

As has been illustrated in FIG. 3, the longitudinal edge extension includes a center section and two lip sections 46. The center and lip sections together form the longitudinal edge extension adapted to the shape of the wind turbine blade. The lip sections are defined as the sides of the longitudinal edge extension and are preferably more flexible than the center section allowing the lip sections to be bend toward the sides of the wind turbine blade.

In the present embodiment the longitudinal edge extension includes a section of a rather circular shape but may include other elliptical shapes with axes of different lengths e.g. a narrow egg shape or a wider dome shape corresponding to the shape of different parts of the wind turbine blade.

The longitudinal edge extension (besides the possibility to integrate the end piece of the tip) preferably includes a width and height ranging between 0.05 and 0.5 meter in circumference and between 0.01 and 0.3 meter in height, corresponding to the shape of different parts of the wind turbine blade. The inner surface of the longitudinal edge extension at the lip sections may also include an adhesive layer (illustrated as a hatched area on one lip section) extending from end to end of the longitudinal edge extension. The layer may cover the lip section parts partly or totally. In a preferred embodiment the adhesive layer is between 10 and 100 mm wide and can be designed to a tightly controlled bond thickness, preferably ranging from 10 mm to 50 mm.

Further, the inner surface includes an inner area at one end of the longitudinal edge extension establishing an inner edge or rim. Similarly, the outer surface of the longitudinal edge extension includes an outer area with an outer edge or rim of between 0.005 and 0.05 m and but at the opposite end of the longitudinal edge extension.

In one embodiment of the invention, the longitudinal edge extension has a longitudinal edge extension thickness range between 0.1 and 5 mm preferably between 0.5 and 1.5 mm e.g. 0.5 mm at or close to the ends of the lip sections and 3 mm at the center of the longitudinal edge extension. Further, the ends may advantageously be rounded in order to establish a smoother crossing to the wind turbine blade. For optimal alignment performance, it has been experimentally established that the joggle features be 5 mm to 20 mm at the thickest section. Thicker sections may use a filler core imbedded within the Fiber Reinforced Plastic (FRP) structure to form the alignment feature and minimize weight.

In one embodiment of the invention, the longitudinal edge extension may have a sandwich configuration including core materials such as balsa, foam and honeycomb. The thickness of the longitudinal edge extension may be between 1 mm and 60 mm. In another embodiment of the invention, the longitudinal edge extension may have a non-sandwich configuration and the corresponding thickness may range between 0.1 and 20 mm. In yet another embodiment of the invention, the length of the longitudinal edge extension may range between 1 and 150 meters.

Referring to FIGS. 2, 3, and 4, shear web structures 16, 26 and 36 typically include upper and lower surfaces mutually connected by two plates. The wind turbine blade shells and beam may be made in glass or other fiber reinforced composites (for instance glass fiber reinforced polyester or epoxy. However, other reinforcing materials may be used such as carbon fiber or aramid (Kevlar). Wood, wood-epoxy, wood-fiber-epoxy or similar composites may also be used as wind turbine blade materials and foam, honeycomb or balsa materials may be added for preventing buckling in a sandwich construction. Typically, in one such blade, 'main laminates' or 'spar caps' are integrated into the blade shells and they provide the stiffness and load bearing.

The shells are illustrated in different shapes or sizes resulting in a leading joint below a longitudinal diametrical plane of the wind turbine blade. However, it shall be emphasized that the leading and trailing joints may be anywhere in the front or rear section of the blade, respectively, and the corresponding longitudinal edge extensions may be modified to correspond with the position of the joint—if necessary.

The centerlines of the longitudinal edge extension preferably correspond with the joint and longitudinal diametrical plane of the wind turbine blade. However, in other embodiments one or more of the centerline, the joint and longitudinal diametrical plane may be spaced apart as long as the longitudinal edge extension covers the joint in particular.

After the assembly of the shells the longitudinal edge extensions may be positioned and attached to the wind turbine blade ending the manufacturing of a wind turbine blade according to the invention.

The longitudinal edge extension may be made of a number of materials or combinations of materials by several production methods. However, in a preferred embodiment the longitudinal edge extension is made in plastic by an injection molding machine. In another embodiment casting in a mold is used to create the longitudinal edge extension in glass fiber material or a similar fiber material such as carbon fiber or aramid material reinforcing an epoxy or polyester resin. Further, the longitudinal edge extension may be manufactured in a thin metal plate e.g. in a rolled or stretch-formed metal with the distance means welded or adhered to the plate or metal particles vapor or electrochemically deposited to the outer surface of a composite or plastic leading edge part. The metals are preferably chosen among the lighter metals such as aluminum and in case needed for more rigidity in thin stainless steel or nickel. The longitudinal edge extension may also be made of different materials such as a plastic plate with rubber distance means. The extensions can also be made with more conventional (VARTM) processes, using vacuum to impregnate the fiber textiles with polyester, vinyl ester, and epoxy resin systems. In such an instance, the removable tooling "lip" molds are used to ensure dimensional accuracy along the entire span of the component.

Figure 11:
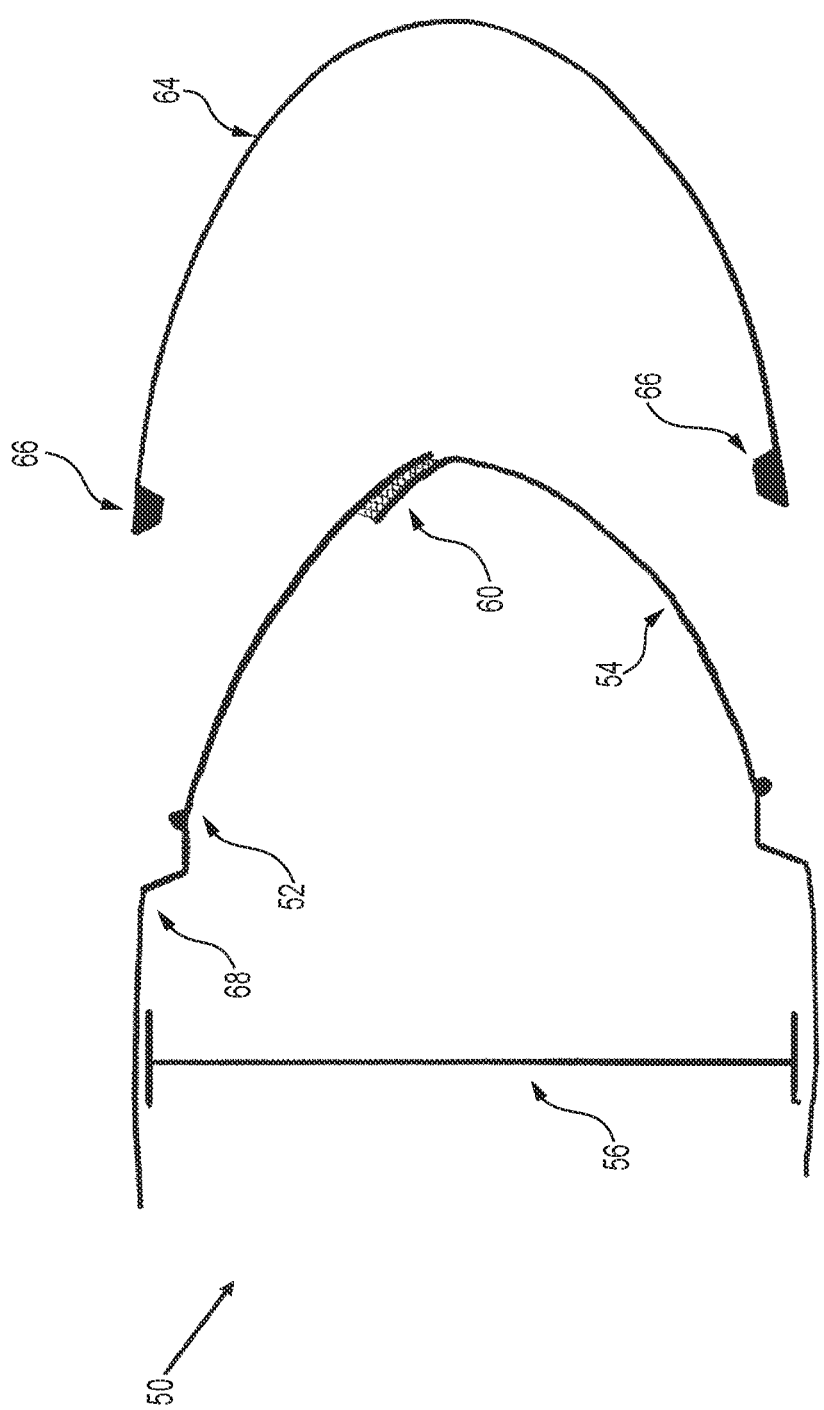
FIG. 11 illustrates an alternative isolated and expanded view of the leading edge region of the wind turbine blade of FIG. 4.

FIG. 4 is an isolated view 50 of the leading edge region of the wind turbine blade 5 of FIGS. 1-3. FIG. 11 illustrates an alternative isolated and expanded view 50 of the leading edge region of the wind turbine blade of FIG. 4. Referring to FIGS. 4 and 11, blade 5 includes downwind shell 52 and upwind shell 54 joined along leading edge 58 to constitute the complete and closed shell structure 11 of FIG. 2. Shear web structure 56 typically includes flanges and is enclosed within and internally coupled to the shell structure 11. A longitudinal edge extension 64 extends at least partially along the leading edge 58. Longitudinal edge extension 64 include lips or joggles 66 that adaptably and removably couple the leading edge extension 64 into corresponding grooves 68 formed into the shell structure of the blade 5.

In one embodiment of the invention the longitudinal edge extension being adequately of substantially covering one or more longitudinal joints of the wind turbine blade or sections hereof. In one embodiment of the invention the longitudinal edge extension being adequately of substantially covering the leading joint of the wind turbine blade. In one embodiment of the invention the inner and outer surfaces of the longitudinal edge extension are smooth or substantially smooth, it is possible to establish a longitudinal edge extension that is easy to mount on the blade due to the direct encircling of the blade. Further, the longitudinal edge extension and the blade are only separated by the adhesive means establishing a direct and strong bonding between the two. Alternatively, for specific uses and ease of exchangeability also metal-composite (mechanical) fasteners can be used for that connection while if necessary combined with a suitable sealant for aerodynamic flushness and fluid-proofing of any gaps and steps.

Even further, the invention also relates to a longitudinal edge extension used as a unit for supplementary mounting on a wind turbine blade. Hereby, it is possible to arrange longitudinal edge extensions on blades being part of erected and operational wind turbines. The longitudinal edge extension arrangement may preferably be performed in relation with the repair of blades including surface damage e.g. from hailstorms, sand storms, strokes of lightning or birds. The repair may take place at the position of the wind turbine with or without dismounting the blades from the wind turbine.

As illustrated in the figures, the first longitudinal edge extension may start at the root of the wind turbine blade and the last longitudinal edge extension end at the tip of the blade, creating a continuous line of longitudinal edge extensions each covering a section of the blade. However, the longitudinal edge extensions may also start and end at other positions, e.g. start and end at some distance from the root and the tip.

Further, one or more longitudinal edge extensions may cover different sections of the wind turbine blade, e.g. a section at the center and the root of the blade with an uncovered section in between or simply one longitudinal edge extension covering one section of the blade. The longitudinal edge extensions are preferably adapted to form an aerodynamic profile with the wind turbine blade in relation to the wind.

Figure 5:
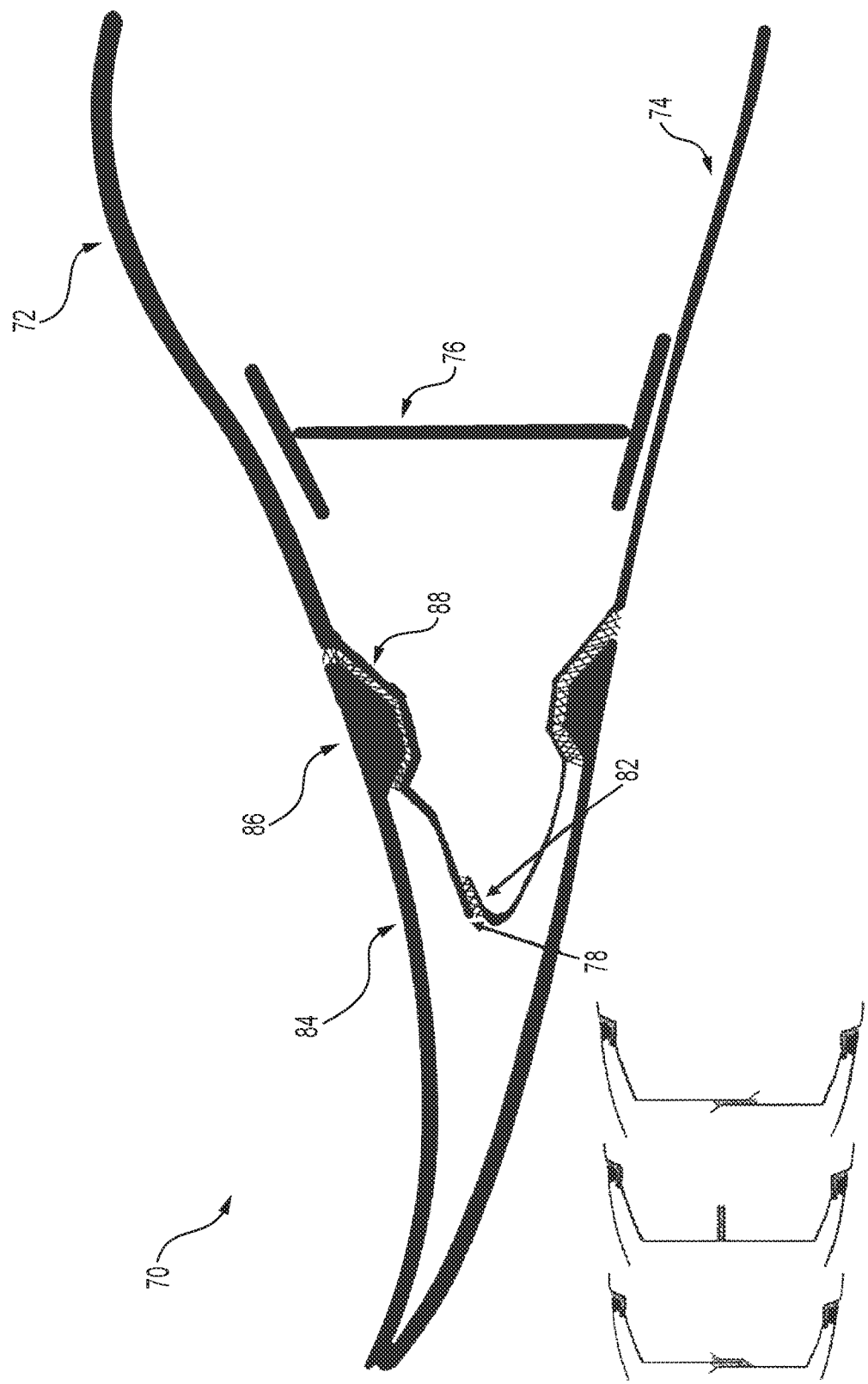
FIG. 5 illustrates an isolated, expanded view of the trailing edge region of the wind turbine blade of FIGS. 1-3.

FIG. 5 is an isolated, expanded view 70 of the trailing edge region of the wind turbine blade 5 of FIGS. 1-3. Referring to FIG. 5, blade 5 includes downwind shell 72 and upwind shell 74 joined along trailing edge 78 to constitute the complete and closed shell structure 11 of FIG. 2. Shear web structure 76 typically includes flanges and is enclosed within and internally coupled to the shell structure. An independent external trailing edge extension 84 extends at least partially along the trailing edge 78. Independent external trailing edge extension 84 include corresponding lips or joggles 86 that adaptably and removably couple the trailing edge extension 64 into corresponding grooves 88 formed into the shell structure of the blade 5.

Figure 6:
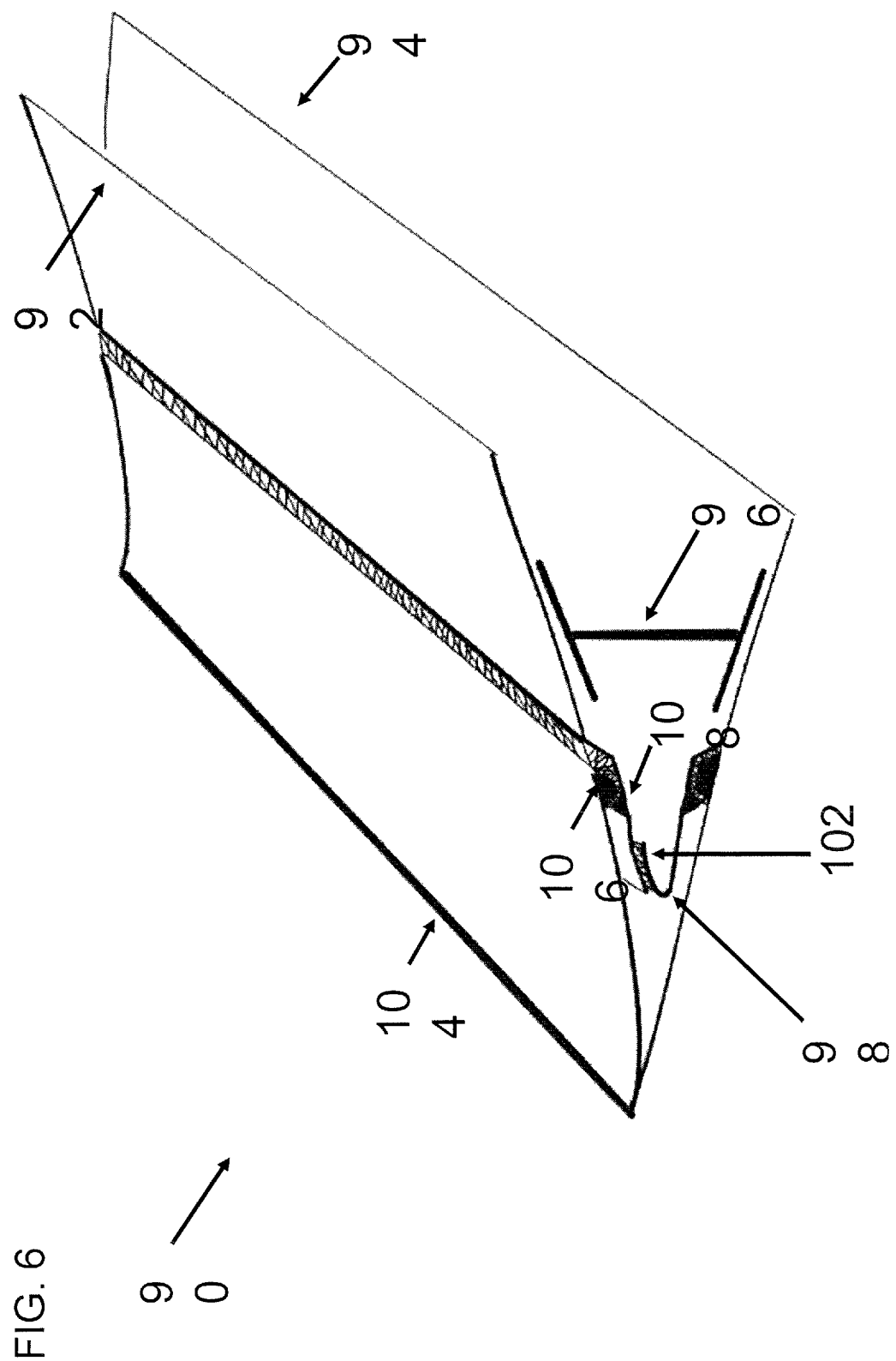
FIG. 6 illustrates an alternative isolated, expanded view of the trailing edge region of the wind turbine blade of FIGS. 1-3.

FIG. 6 is an alternative isolated, expanded view 90 of the trailing edge region of the wind turbine blade 5 of FIGS. 1-3. Referring to FIG. 6, blade 5 includes downwind shell 92 and upwind shell 94 joined along trailing edge 98 to constitute the complete and closed shell structure 11 of FIG. 2. Shear web structure 96 typically includes flanges and is enclosed within and internally coupled to the shell structure. An independent external trailing edge extension 104 extends at least partially along the trailing edge 98. Independent external trailing edge extension 104 include corresponding lips or joggles 106 that adaptably and removably couple the trailing edge extension 104 into corresponding grooves 108 formed into the shell structure of the blade 5.

FIGS. 4, 5 and 6 illustrate that the lip sections do not readily connect with the sides of the wind turbine blade as they extend in an acuter angle than the blade shape. However, the extension angle may also be less than the blade requiring that the longitudinal edge extension be forced onto the blade by expanding the lip sections further out. By the expansion of the lip sections against the sides of the wind turbine blade, an enclosure of the space beneath the longitudinal edge extension is established, which is subsequently filled and closed with an appropriate quantity of adhesive mass.

The adhesive mass may preferably be chosen among one-component or two-component adhesives such as epoxy, polyurethane or methacrylate adhesives. Other adhesives may however be used in order to semi-permanently bond and/or seal flush and fluid-proof the longitudinal edge extension to the wind turbine blade. The space may in one embodiment be filled from a filling hole e.g. at the opening between the first longitudinal edge extension and the wind turbine blade at the root of the blade.

In a further embodiment the root filling hole may be complemented with holes at some longitudinal edge extensions or even each longitudinal edge extension e.g. in form of filling holes in the crossings between the longitudinal edge extensions.

It shall be emphasized that the space closure may include a number of holes, in addition to the filling holes, such as holes ventilating the adhesive mass during the curing. The holes may be closed at a following aftertreatment of the wind turbine blade.

After the bonding any additional adhesive means expanding out from the longitudinal edge extension, e.g. at the sides or ends, are removed. The removal is preferably performed before the curing of the adhesive means is fully completed.

Referring specifically to elements 62, 82 and 102 in FIGS. 4, 5, and 6 respectively, in one embodiment of the invention is provided a method for the manufacture and joining the upwind and downwind shells by putting one composite panel to another via a double-wall lap shear connection. During the molding process of manufacturing composite panels, pre-assembled dry textiles, or pre-molded composite parts, are integrated into the panel laminates, and form the two complementary part edges of a socket joint, a male and a female. Afterwards, the panels are bonded together with adhesive, resin, or glass-resin longitudinal edge extensions, using these edges to relatively align and fix panel to panel.

Conventional composite panel bonding is achieved by molding into the panel a bonding flange that is in the shape of an "L", or an obtusely angled "Y". Thixotropic adhesive paste is applied to one panel's bonding flange, then the bonding flange of the opposing panel is pushed into the bed of adhesive using a significant amount of pressure. This process has three primary drawbacks. (1) In practice, the flanges have a large bond gap variance, which in turn necessitates nearly double the nominal amount of adhesive that is required for bonding. (2) The exterior, mold-surface leg of the "L" or "y" needs to be trimmed off during post-molding in a process that involves trimming, over-taping, gel-coating, and sanding, which accounts for a significant amount of time, labor, and surface variance. (3) Thixotropic adhesive paste requires large amounts of pressure to move, which is exacerbated by large bond areas. This pressure deforms parts and serves to increase the cost of molds and their closing mechanisms.

Specifically, the male and female joint architectures are molded using formers that lock into the mold flanges. The parts are in fixed and cured, and then flange molds are removed, leaving male and female part edges, with the male extending past the flange of mold. Following the infusion, during the mold closure process, a woven or stitched fiber-glass ply is impregnated with resin and draped evenly over the protruding edge of the male. When the molds close, as the female part edge comes down on top of the male, the "Y" top of the female registers the male, and the parts self-align to create a finished longitudinal blade joint. Resin impregnated woven textiles may also be used, possibly in conjunction with thixotropic adhesive, in other joint architectures as a method for maintaining a nominal structural strength with minimizing adhesive usage and process waste.

In essence, the necessity of any leading edge over-taping in post-molding is eliminated; joint process waste significantly reduced; internal, parasitic adhesive mass significantly reduced; joint mass reduces; a finished double lap-shear longitudinal joint automatically created.

In other embodiments of the invention, butt joints; partial over tapes; single-lap shear auto-formed joints may be used. The male/female part infusion process and longitudinal joint assembly process has been demonstrated on 7 m representative shell tooling.

Figure 7:
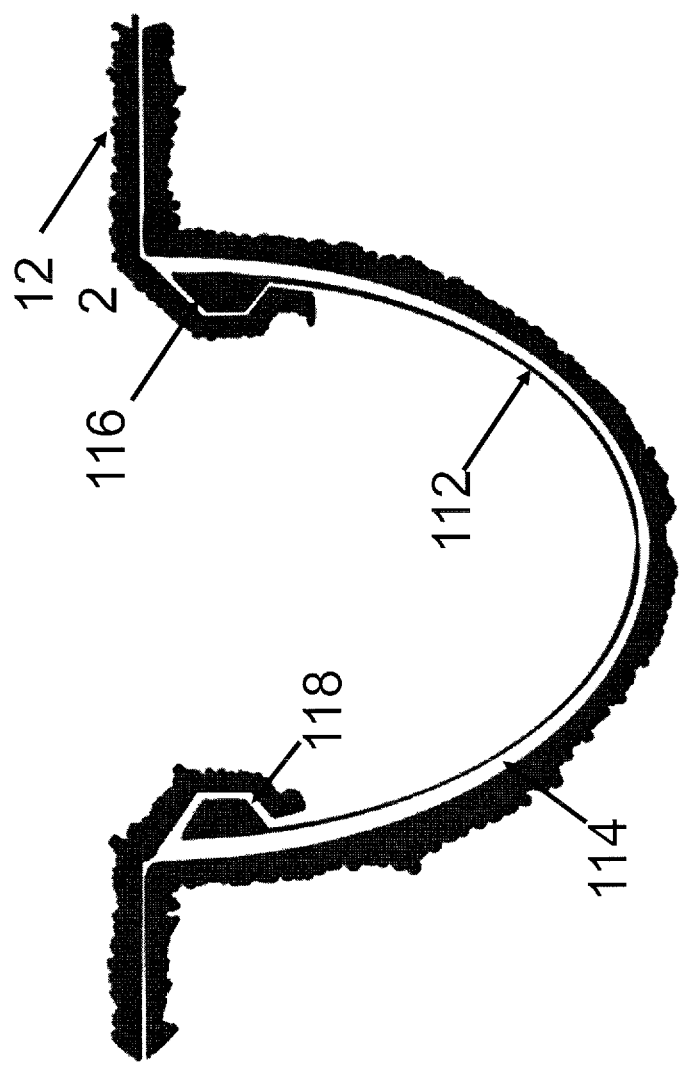
FIG. 7 is a cross-sectional view of the tooling set-up for the leading edge and leading edge extension of the wind turbine blade of FIGS. 1-3.

FIG. 7 is a cross-sectional view of the tooling set-up 110 for leading edge and leading edge extension of the wind turbine blade 5 of FIGS. 1-3. Referring to FIG. 7, the tooling set-up 110 includes leading edge 112 harnessed with leading edge extension 114. The leading edge extension 114 includes at least two lips 116 that fit into the corresponding grooves 118 formed on the leading edge 112. As has been explained above, the lips or joggles 116 adaptably and removably couple the leading edge extension 114 into corresponding grooves 118 formed into the shell structure of the blade 5

Figure 8:
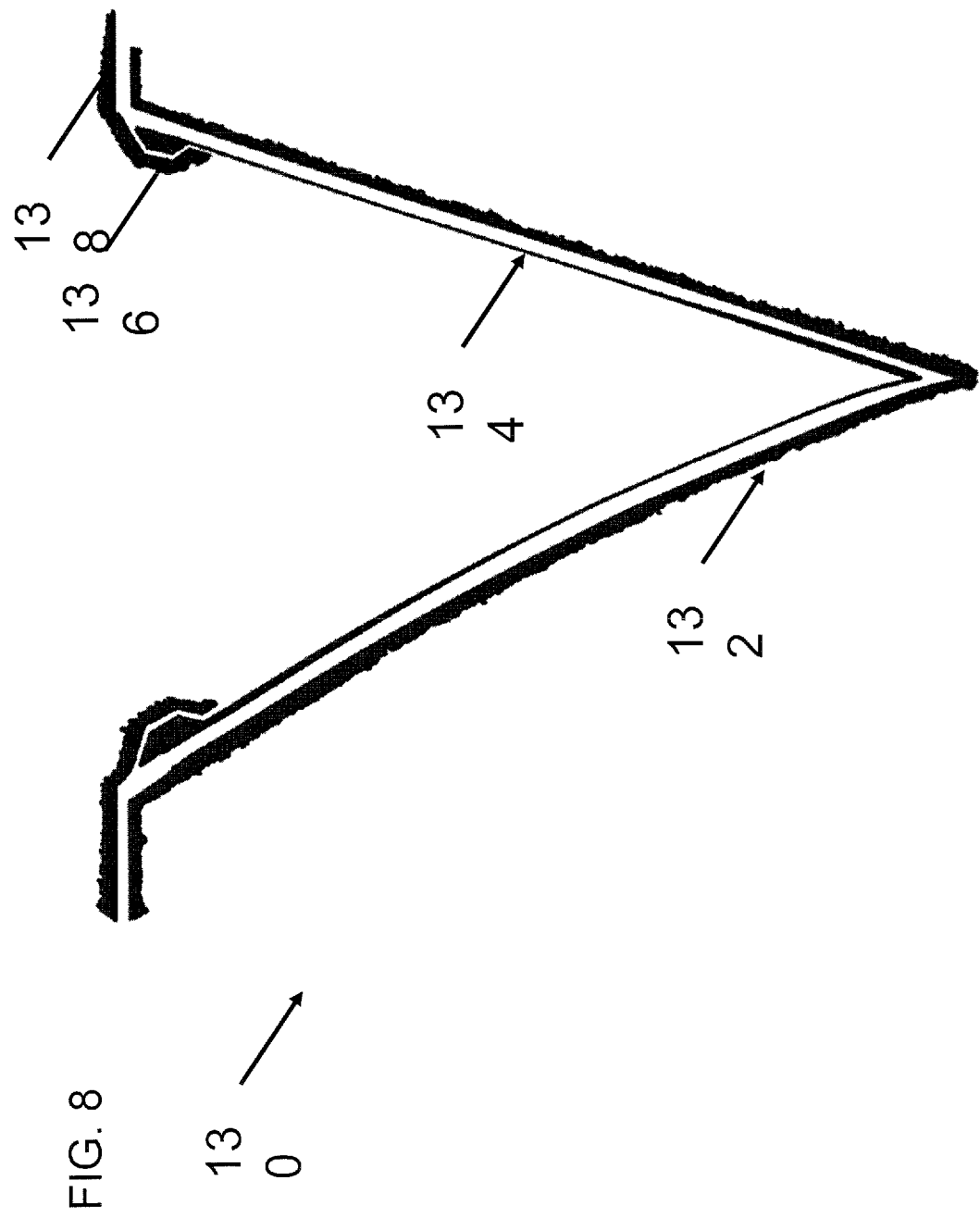
FIG. 8 is a cross-sectional view of the tooling set-up for the trailing edge and trailing edge extension of the wind turbine blade of FIGS. 1-3.

FIG. 8 is a cross-sectional view of the tooling set-up 130 for trailing edge and trailing edge extension of the wind turbine blade 5 of FIGS. 1-3. Referring to FIG. 8, the tooling set-up 130 includes trailing edge tooling 132 harnessed with trailing edge extension part 134. The trailing edge extension 134 may include at least two lips 136 that fit into the corresponding grooves 138 formed on the trailing edge 132. As has been explained above, the lips or joggles 136 adaptably and removably couple the trailing edge extension 134 into the corresponding grooves 138 formed into the shell structure of the blade 5.

In relation to flow it is hereby possible to create an advantageous wind turbine blade with a particular smooth surface at important parts of the blade.

In one embodiment of the invention one or more longitudinal edge extensions partly or totally cover one or more of the at least two substantially longitudinal joints. As the joint of the wind turbine blade is covered with the longitudinal edge extension the constructing of the wind turbine blade does not need to involve any further aftertreatment in relation to the joint.

In one embodiment of the invention, the longitudinal edge extensions continuously or substantially cover the blade from root to tip, it is possible to establish a similar flow over the different parts of the wind turbine blade. Hereby it is possible to establish a longitudinal edge extension with a smooth and well-defined surface to cover a section of the wind turbine blade. the longitudinal edge extensions either adaptably and comprehensively transitions or sweeps from the first longitudinal edge at a root of the blade to the second longitudinal edge of the blade.

In another embodiment of the invention, the longitudinal edge extension is made separately from the shell structure and the shear web structure and the longitudinal edge extension comprises rigidity to withstand aerodynamic forces prevailing under normal operating conditions. In yet another embodiment of the invention the longitudinal edge extension is removably coupled to the shell structure and the longitudinal edge extension is semi-permanently attached to the wind turbine shell structure with bonding elements. Further the longitudinal edge extension is fixed to an outer surface of the first longitudinal edge such that a plurality of edges of the longitudinal edge extension are flush with the longitudinal edge.

In one embodiment of the invention, the longitudinal edge extension may be made of either thermoplastic or thermoset resin, optionally in combination with at least one of glass, carbon or other fibers. In another embodiment of the invention, the longitudinal edge extension may be made of metals, ceramics, or metals and ceramics, optionally in combination with at least one of glass, carbon or other fibers. In yet another embodiment of the invention, the longitudinal edge extension may be made of materials independently designed to result in an enhanced performance of the longitudinal edge extension alone, independent of rest the blade.

In construction, the longitudinal edge extension includes a center section and at least one peripheral section, and the peripheral section of the longitudinal edge extension may include lips for bonding or fastening with locations obtained by external tooling or for self-engaging or self-locking with corresponding grooves formed on the first longitudinal edges. Further the longitudinal edge extension is partly or totally pre-formed to a shape substantially corresponding to the wind turbine blade or sections thereof. The longitudinal edge extension may be molded or formed to a shape such that when sprung into final position, it has an aerodynamic shape.

Figure 9:
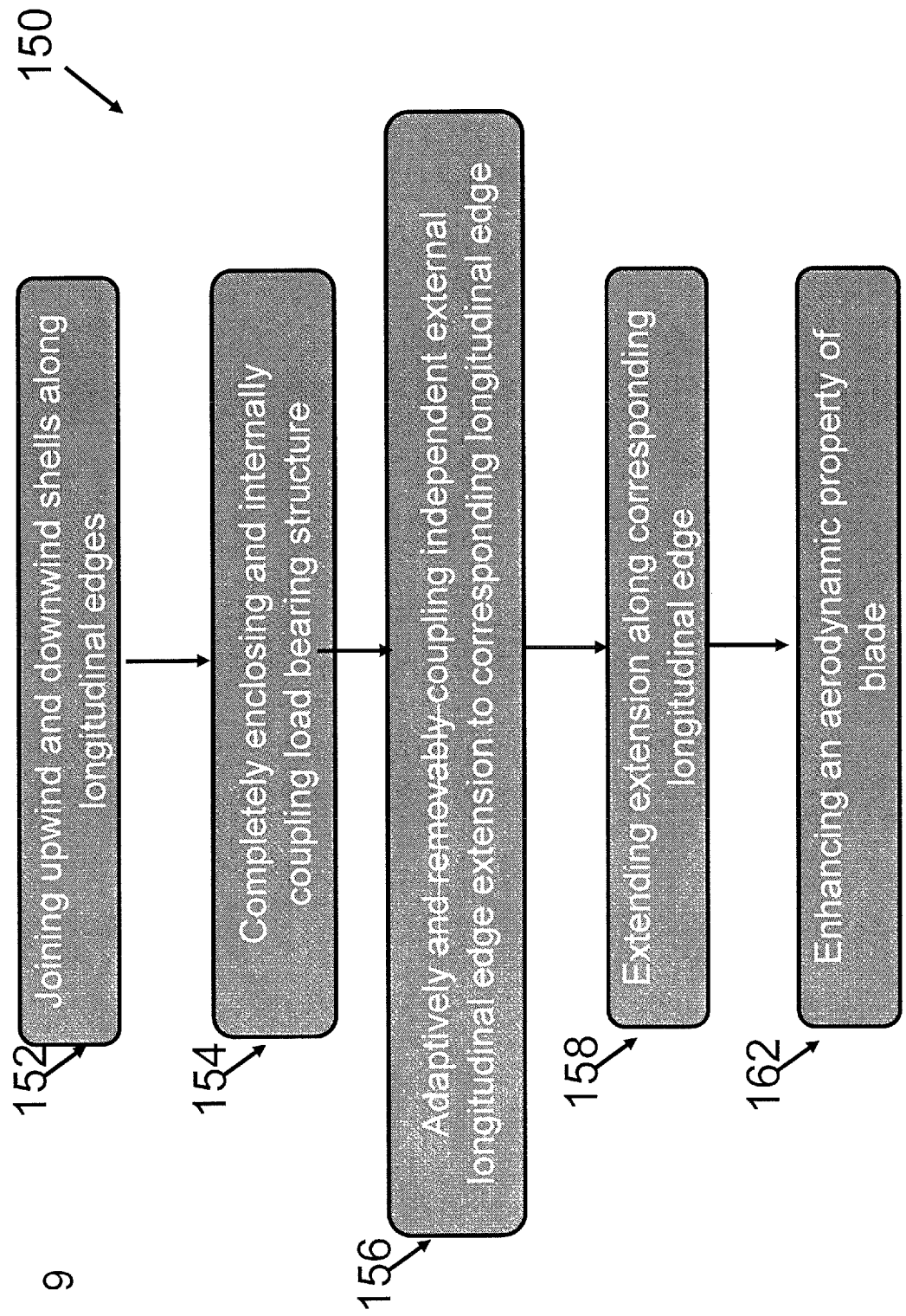
FIG. 9 illustrates a flow chart of the manufacturing of a wind turbine blade including a preferred embodiment of a longitudinal edge extension according to the invention.

FIG. 9 illustrates a flow chart of a method 150 of manufacturing a wind turbine blade including a preferred embodiment of a longitudinal edge extension according to the invention. The manufacturing method 150 includes the steps: joining at least one upwind shell and at least one downwind shell 152 along a first longitudinal edge and a second longitudinal edge to form a shell structure; structurally integrating the shell structure by internally coupling and enclosing at least one shear web structure within the shell structure 154; adaptably and discretely coupling the structurally independent longitudinal edge extension to the shell structure 156, wherein the independent longitudinal edge extension extends at least partially along the first longitudinal edge 158 and enhances an aerodynamic property of the shell structure 162.

In one embodiment of the invention, the attaching comprises the lips of the longitudinal edge extension may be placed within the corresponding grooves, the lips self-engaging or self-locking or self-indexing themselves within the corresponding grooves forming lip-to-groove spaces, and then the lip-to-groove spaces are closed with bonding or sealing elements.

Figure 10:
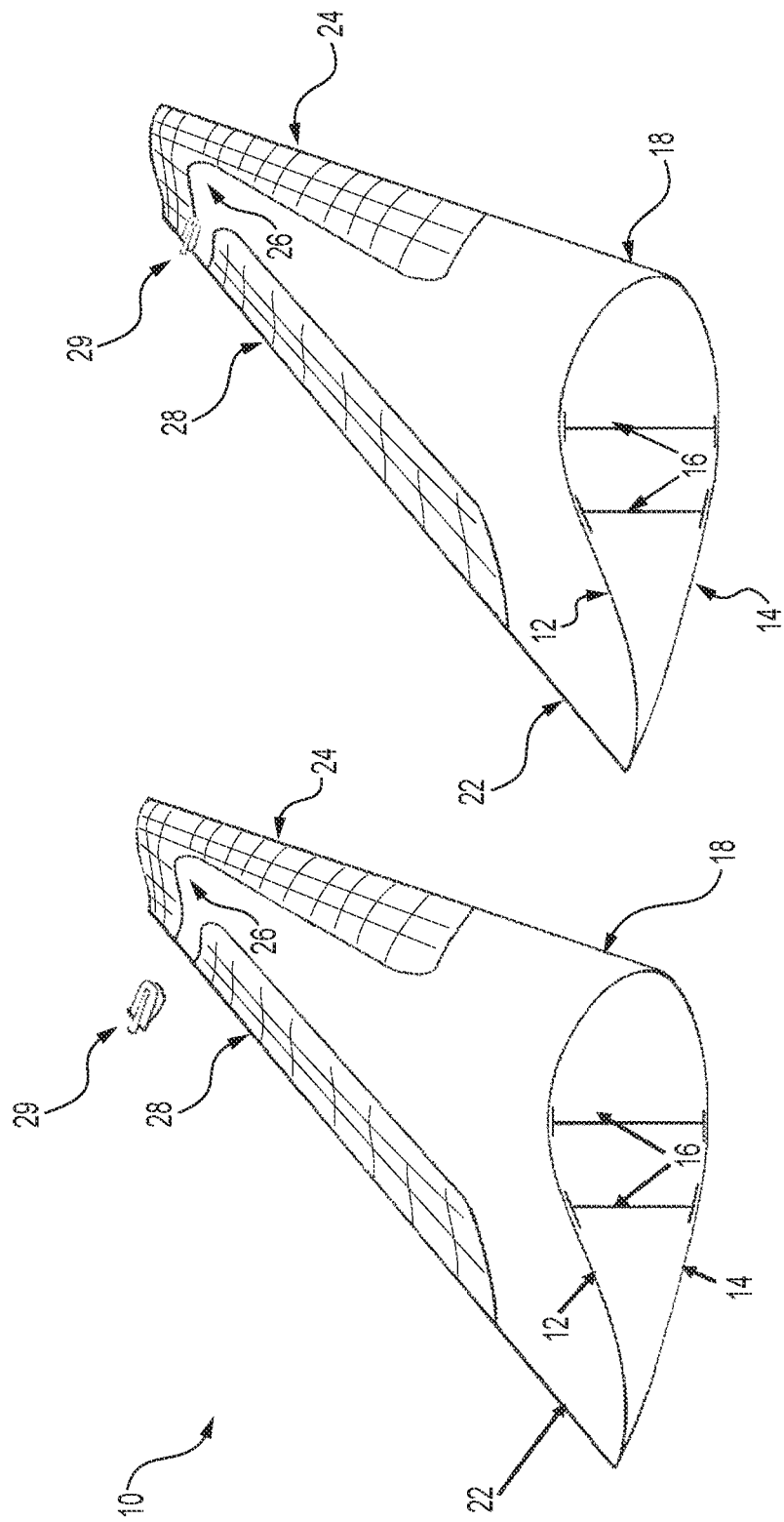
FIG. 10 illustrates an alternative isometric view of the wind turbine blade of FIG. 1 of the wind turbine blade of FIG. 2.

FIG. 10 illustrates an alternative isometric view of the wind turbine blade of FIG. 1 of the wind turbine blade of FIG. 2. Referring to FIG. 10, in one embodiment of the invention, the longitudinal edge extensions may be covered by clamps 29 made of thermoplastic, graphite, metal, or other material, and thereby enhancing the joint aerodynamically. In yet another embodiment of the invention, the clamps 29 may be configured to serve as a grounding conduit to protect the blades from lightning strikes. In one further embodiment of the invention, the clamps 29 may be configured so that at least one of them can be heated and then used to de-ice a wind turbine blade or part of it under prevailing weather conditions.

A technical contribution for the disclosed method and system is to provide an enhancement in performance of the leading edges; to achieve improved energy efficiency of wind turbine blades; and additionally, to manufacture wind turbine blades without aftertreatment involving time consuming processes that eventually lead to an increase in the costs of the blades. This solution is also facilitating more easily other functions found in leading edge and trailing edge areas of the wind turbine blade in particular Icing Mitigation System (IMS) and/or Lightning Protection System (LPS).

According to one embodiment of the invention, there is provided a longitudinal edge extension for a wind turbine blade. In a preferred embodiment, the longitudinal edge extension is arranged to extend at least partially along an edge of an aerofoil structure to modify an aerodynamic characteristic of the aerofoil structure, wherein the longitudinal edge extension is adaptably and discretely couplable to the edge.

According to a second aspect of the present invention, there is provided a wind turbine blade comprising a shell structure defining a leading edge and a trailing edge. The wind turbine blade also comprises a longitudinal edge extension arranged to extend at least partially along the leading edge or at least partially along the trailing edge to modify an aerodynamic characteristic of the wind turbine blade. The longitudinal edge extension preferably comprises a center section and at least one peripheral section comprising attachment means. In a preferred embodiment, the shell structure is arranged to engage with the attachment means to secure the longitudinal edge extension. This wind turbine blade enjoys the same advantages mentioned above in respect of the first aspect of the present invention.

According to a third aspect of the present invention, there is provided a method of manufacturing a wind turbine blade, said method comprising: providing a shell structure defining a leading edge and a trailing edge; extending a longitudinal edge extension at least partially along the leading edge or at least partially along the trailing edge, wherein said longitudinal edge extension comprises a center section and at least one peripheral section comprising attachment means; arranging said shell structure to engage with the attachment means to secure the longitudinal edge extension; and modifying an aerodynamic characteristic of the wind turbine blade. In one embodiment, the extending a longitudinal edge extension comprises extending a structurally independent external longitudinal edge extension. This method enjoys the same advantages mentioned above in respect of the first and second aspects of the present invention.

While the invention has been described in detail in connection with only a limited number of embodiments, it should be readily understood that the invention is not limited to such disclosed embodiments. Further, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not limited by the foregoing description, but is only limited by the scope of the appended claims.

LIST

1. Wind turbine
2. Wind turbine tower
3. Wind turbine nacelle
4. Wind turbine hub
5. Wind turbine blade
10 isometric view of wind turbine blade
11 shell structure
12 downwind shell
14 upwind shell
16 shear web structure
18 leading edge
22 trailing edge
24 leading edge extension
26 transition region of leading edge extension
28 trailing edge extension
29 clamp
30 isometric view of wind turbine blade
32 downwind shell
34 upwind shell
36 shear web structure
38 leading edge
42 trailing edge
44 leading edge extension
46 lips of leading edge extension
48 grooves formed on leading edge
50 isometric view of wind turbine blade leading edge
52 downwind shell
54 upwind shell
56 shear web structure
58 leading edge
60 first joint type for the leading edge
61 second joint type for the leading edge
62 third joint type for the leading edge 63 fourth joint type for the leading edge
64 leading edge extension
66 lips of leading edge extension
68 grooves formed on leading edge
70 isometric view of wind turbine blade trailing edge
72 downwind shell
74 upwind shell
76 shear web structure
78 trailing edge
82 joint region of the trailing edge
84 leading edge extension
86 lips of trailing edge extension
88 grooves formed on trailing edge
90 isometric view of wind turbine blade trailing edge
92 downwind shell
94 upwind shell
96 shear web structure
98 trailing edge
102 joint region of the trailing edge
104 leading edge extension
106 lips of trailing edge extension
108 grooves formed on trailing edge
110 isometric view of tooling for leading edge and leading edge extension
112 leading edge
114 leading edge extension
116 lips of the leading edge extension
118 grooves on the leading edge
122 tooling for the leading edge and leading edge extension
130 isometric view of tooling for trailing edge and trailing edge extension
132 trailing edge
134 trailing edge extension
136 lips of the trailing edge extension
138 grooves on the trailing edge
142 tooling for the trailing edge and trailing edge extension
150 method of manufacturing a wind turbine blade
152 joining upwind and downwind shells along longitudinal edges
154 enclosing and internally coupling shear web structure
156 adaptively and removably coupling independent longitudinal edge
extension to corresponding longitudinal edge
158 extending extension along corresponding longitudinal edge
162 enhancing aerodynamic property of blade

What is claimed is:

1. A wind turbine blade comprising:
a shell structure defining a leading edge and a trailing edge;
a longitudinal edge extension arranged to extend at least partially along said leading edge or at least partially along said trailing edge to modify an aerodynamic characteristic of said wind turbine blade, wherein said longitudinal edge extension comprises a center section and at least one peripheral section comprising attachment means, and the shell structure is arranged to engage with the attachment means to secure the longitudinal edge extension; and
at least one clamp covering at least one of said leading edge and said trailing edge.

2. The wind turbine blade according to claim 1, wherein said longitudinal edge extension is adaptably and discretely coupled to at least one of: said leading edge or said trailing edge.

3. The wind turbine blade according to claim 1, wherein said shell structure comprises at least one shear web structure enclosed within, internally coupled to said shell structure and configured to provide structural integrity to said shell structure.

4. The wind turbine blade according to claim 1, wherein at least one of said leading edge and said trailing edge comprises a longitudinal joint having a connection.

5. The wind turbine blade according to claim 1, wherein said longitudinal edge extension is configured to provide rigidity to at least one of said leading edge and said trailing edge against aerodynamic forces prevailing under normal operating conditions.

6. The wind turbine blade according to claim 1, wherein said longitudinal edge extension is removably coupled to said shell structure, or
wherein said longitudinal edge extension is semi-permanently attached to said wind turbine shell structure with bonding elements, or
wherein said longitudinal edge extension is fixed to an outer surface of said at least one of: said leading edge or said trailing edge such that a plurality of edges of the longitudinal edge extension are flush with corresponding surfaces of the blade.

7. The wind turbine blade according to claim 1, wherein said longitudinal edge extension comprises a sandwich configuration comprising core materials comprising balsa, foam and honeycomb and wherein said longitudinal edge extension further comprises a thickness ranging between 1 mm and 60 mm, or
wherein said longitudinal edge extension comprises a non-sandwich configuration comprising a thickness ranging between 0.1 and 20 mm thickness.

8. The wind turbine blade according to claim 1, wherein said longitudinal edge extension is partly or totally preformed to a shape substantially corresponding to the wind turbine blade or sections thereof,
optionally wherein said longitudinal edge extension is molded or formed to a shape such that when sprung into final position, it has an aerodynamic shape, or
wherein the attachment means comprises lips for bonding or fastening with locations obtained by external tooling.

9. The wind turbine blade according to claim 1, wherein the at least one clamp is made of at least one of: thermoplastic, graphite, metal, or other material,
whereby the at least one clamp aerodynamically enhances a joining area between said longitudinal edge extension and at least one of said leading edge and said trailing edge, and
optionally, said clamp being configured to serve as a grounding conduit to protect said wind turbine blade from lightning strikes, or to de-ice said wind turbine blade.

10. The wind turbine blade according to claim 1, wherein said longitudinal edge extension comprises a structurally independent external longitudinal edge extension.

11. The wind turbine blade according to claim 1, wherein said shell structure comprises at least one upwind shell and at least one downwind shell joined along at least one of: said leading edge or said trailing edge, and
optionally, wherein said longitudinal edge extension covers a first percentage of chord area on said upwind shell and a second percentage of chord area on said downwind shell, wherein both of said first percentage of chord area and said second percentage of chord area range between 5% and 40%, considering from the respective stagnation points.

12. The wind turbine blade according to claim 4, wherein the longitudinal joint is an auto-engaging longitudinal joint or an auto-indexing longitudinal joint.

13. The wind turbine blade according to claim 4, wherein the connection is selected from the group consisting of a single-lap shear connection, a double-lap shear connection, a butted shear connection, and combinations thereof.

14. The wind turbine blade according to claim 4, wherein the connection comprises a mechanical fastener, a thixotropic adhesive paste, an injected low viscosity resin system, an infused low viscosity resin system, or resin-impregnated woven textiles.

15. The wind turbine blade according to claim 1, wherein the shell structure engages with the attachment means only at the at least one peripheral section.

16. The wind turbine blade according to claim 1, wherein the attachment means comprises at least one peripheral lip engaging with a groove formed in the shell structure.

17. The wind turbine blade according to claim 1, wherein the attachment means comprises at least one peripheral lip engaging with a groove formed on an external surface of, and external to, the shell structure.

18. A method of manufacturing a wind turbine blade, said method comprising:
providing a shell structure defining a leading edge and a trailing edge;
extending a longitudinal edge extension at least partially along the leading edge or at least partially along the trailing edge, wherein said longitudinal edge extension comprises a center section and at least one peripheral section comprising attachment means;
arranging said shell structure to engage with the attachment means to secure the longitudinal edge extension;
covering at least one of said leading edge and said trailing edge with at least one clamp; and
modifying an aerodynamic characteristic of the wind turbine blade.

19. The method of claim 18, further comprising adaptably and discretely coupling said longitudinal edge extension to at least one of: said leading edge or said trailing edge.

20. The method of claim 19, further comprising:
removably coupling said at least one longitudinal edge extension to said shell structure, or
semi-permanently attaching said longitudinal edge extension to said wind turbine shell structure with bonding elements, or
attaching said longitudinal edge extension to an outer surface of said at least one of: said leading edge or said trailing edge such that a plurality of edges of the longitudinal edge extension are flush with corresponding surfaces of the blade, or
wherein said longitudinal edge extension is partly or totally pre-formed to a shape substantially corresponding to the wind turbine blade or sections thereof.

21. The method of claim 19, wherein the attachment means comprise lips for self-engaging or self-locking with corresponding grooves formed on the leading edge,
optionally wherein said extension comprises the steps of:
placing said lips within said corresponding grooves, said lips self-engaging or self-locking or self-indexing themselves within said corresponding grooves forming lip-to-groove spaces, and closing said lip-to-groove spaces with bonding or sealing elements, or
optionally wherein said longitudinal edge extension is molded or formed to a shape such that when sprung into final position, it has an aerodynamic shape.

22. The method of claim 19, wherein the at least one clamp is made of at least one of: thermoplastic, graphite, metal, or other material,
whereby the at least one clamp aerodynamically enhances a joining area between said longitudinal edge extension and at least one of said leading edge and said trailing edge,
the method optionally further comprising configuring said at least one clamp to serve as a grounding conduit to protect said blade from lightning strikes, or to de-ice said blade.

23. The method of claim 18, wherein extending a longitudinal edge extension comprises extending a structurally independent external longitudinal edge extension.

24. The method of claim 18, further comprising providing structural integrity to said shell structure by internally coupling and enclosing at least one shear web structure within said shell structure.

25. The method of claim 18, wherein providing said shell structure comprises joining at least one upwind shell and at least one downwind shell along at least one of: said leading edge or said trailing edge, and
optionally, further comprising joining said at least one upwind shell and at least one downwind shell along a longitudinal joint with a connection.

26. The method of claim 25, wherein the longitudinal joint is an auto-engaging longitudinal joint or an auto-indexing longitudinal joint.

27. The method of claim 25, wherein the connection is selected from the group consisting of a single-lap shear connection, a double-lap shear connection, a butted shear connection, and combinations thereof.

28. The method of claim 25, wherein the connection comprises a mechanical fastener, a thixotropic adhesive paste, an injected low viscosity resin system, an infused low viscosity resin system, or resin-impregnated woven textiles.

29. The method of claim 18, further comprising configuring said longitudinal edge extension to provide rigidity to at least one of said leading edge and said trailing edge against aerodynamic forces prevailing under normal operating conditions.

30. The method of claim 18, wherein the shell structure engages with the attachment means only at the at least one peripheral section.

31. The method of claim 18, wherein the attachment means comprises at least one peripheral lip engaging with a groove formed in the shell structure.

32. The method of claim 18, wherein the attachment means comprises at least one peripheral lip engaging with a groove formed on an external surface of, and external to, the shell structure.

* * * * *